US008584642B2

(12) United States Patent
Abendroth et al.

(10) Patent No.: US 8,584,642 B2
(45) Date of Patent: Nov. 19, 2013

(54) METHOD FOR DETECTING A TOW START OPERATION OF AN INTERNAL COMBUSTION ENGINE

(75) Inventors: Dirk Abendroth, Munich (DE); Werner Weigl, Ismaning (DE); Peter Straehle, Poing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 710 days.

(21) Appl. No.: 12/543,823

(22) Filed: Aug. 19, 2009

(65) Prior Publication Data

US 2009/0308341 A1 Dec. 17, 2009

Related U.S. Application Data

(63) Continuation of application No. PCT/EP2008/001407, filed on Feb. 22, 2008.

(30) Foreign Application Priority Data

Feb. 28, 2007 (DE) ........................ 10 2007 009 872

(51) Int. Cl.
*F02N 11/08* (2006.01)
*G01M 15/04* (2006.01)

(52) U.S. Cl.
USPC .................. 123/179.1; 123/179.2; 123/179.3; 123/198 D; 74/6; 73/114.58; 73/114.59

(58) Field of Classification Search
USPC .................. 123/406.23, 335, 406.56, 406.65, 123/406.47, 179.1–179.4, 198 D; 701/21, 701/99, 102, 51, 59, 1, 103; 180/65.23, 180/65.24; 404/1, 87; 73/114.58–114.59; 74/6, 7 R
See application file for complete search history.

(56) References Cited

U.S. PATENT DOCUMENTS

| | | | | |
|---|---|---|---|---|
| 4,481,425 | A * | 11/1984 | Hori et al. | 290/51 |
| 5,698,905 | A | 12/1997 | Ruethlein et al. | |
| 6,526,931 | B1 | 3/2003 | Vilou | |
| 7,748,362 | B2 * | 7/2010 | Whitney et al. | 123/406.23 |

(Continued)

FOREIGN PATENT DOCUMENTS

| | | |
|---|---|---|
| DE | 44 35 613 C1 | 3/1996 |
| DE | 100 37 544 A1 | 3/2001 |

(Continued)

OTHER PUBLICATIONS

German Search Report dated Nov. 9, 2007 with English translation (nine (9) pages).

(Continued)

*Primary Examiner* — Lindsay Low
*Assistant Examiner* — Kevin Lathers
(74) *Attorney, Agent, or Firm* — Crowell & Moring LLP

(57) ABSTRACT

A method is provided for detecting a tow start operation of an internal combustion engine in a motor vehicle. In this case, a signal representing the activity and/or inactivity of a starter unit of the internal combustion engine is detected. A tow start operation of the internal combustion engine is determined when, following detection of a successful start-up process of the internal combustion engine, the signal representing the activity and/or inactivity of the starter unit has not displayed any activity of the starter unit since the beginning of the start-up process of the internal combustion engine.

14 Claims, 1 Drawing Sheet

(56) References Cited

U.S. PATENT DOCUMENTS

| | | | | |
|---|---|---|---|---|
| 2001/0023384 | A1 * | 9/2001 | Nishimura | 701/51 |
| 2003/0154952 | A1 | 8/2003 | Osawa | |
| 2004/0112317 | A1 | 6/2004 | Tumback et al. | |
| 2008/0078592 | A1 * | 4/2008 | Akasam et al. | 180/65.2 |

FOREIGN PATENT DOCUMENTS

| | | | |
|---|---|---|---|
| DE | 100 30 290 | A1 | 8/2001 |
| DE | 101 51 680 | A1 | 5/2003 |
| DE | 103 06 954 | A1 | 9/2003 |
| EP | 0 849 467 | B1 | 6/1998 |
| EP | 1 134 389 | B1 | 9/2001 |
| GB | 2 354 297 | A | 3/2001 |
| WO | WO 03/049965 | A1 | 6/2003 |

OTHER PUBLICATIONS

International Search Report dated Jul. 23, 2008 with English translation (six (6) pages).

* cited by examiner

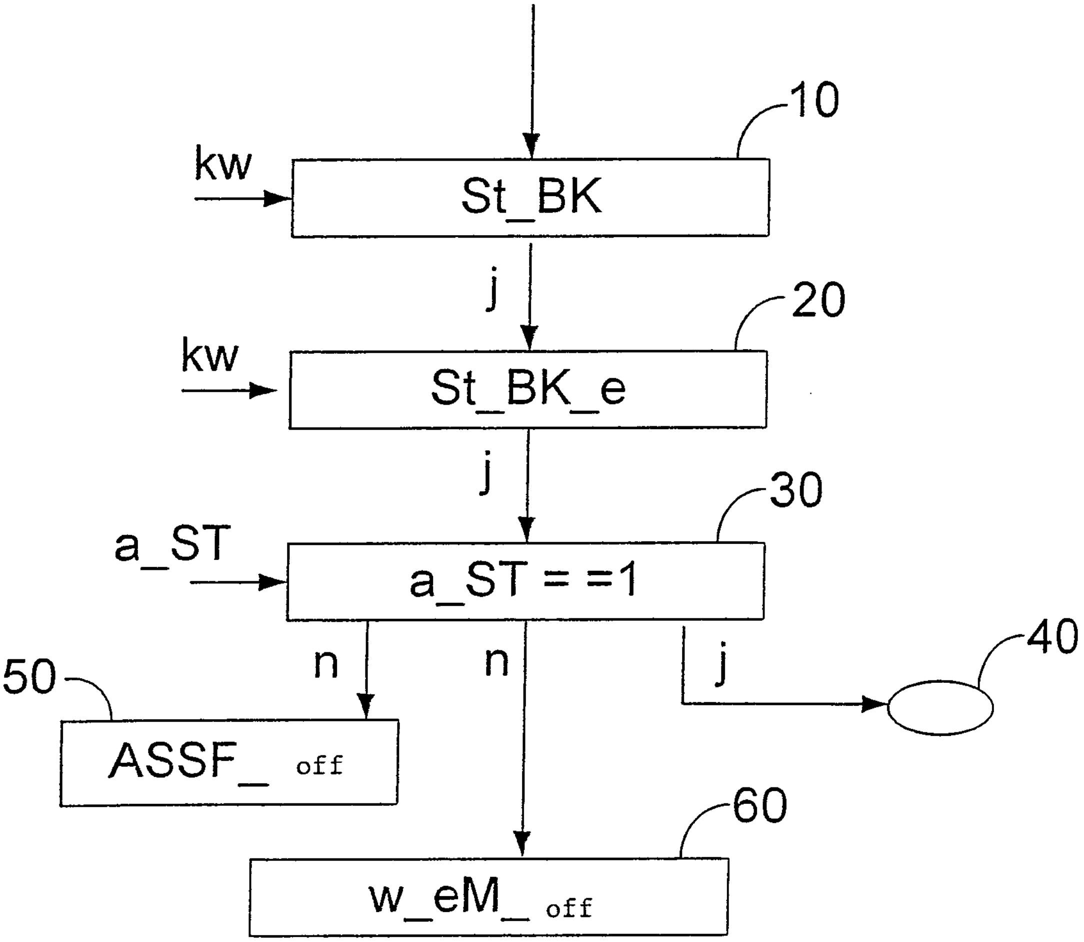
10
kw
St_BK
j
20
kw
St_BK_e
j
30
a_ST
a_ST = =1
n
n
j
40
50
ASSF_ off
60
w_eM_ off

METHOD FOR DETECTING A TOW START OPERATION OF AN INTERNAL COMBUSTION ENGINE

CROSS-REFERENCE TO RELATED APPLICATIONS

This application is a continuation of PCT International Application No. PCT/EP2008/001407, filed Feb. 22, 2008, which claims priority under 35 U.S.C. §119 to German Patent Application No. DE 10 2007 009 872.5, filed Feb. 28, 2007, the entire disclosures of which are herein expressly incorporated by reference.

This application contains subject matter related to U.S. application Ser. No. 12/543,882, entitled "Method for Controlling an Automatic Shut-off Process of an Internal Combustion Engine," filed on even date herewith.

BACKGROUND AND SUMMARY OF THE INVENTION

The invention relates to a method for detecting a tow start operation of an internal combustion engine in a motor vehicle.

Under some circumstances it can occur that the internal combustion engine of a motor vehicle is not started by a vehicle's internal starter unit, but rather is tow started by hand. This is the case, for example, when the starter or an additional component of the vehicle start-up system is defective or when the available power of the starter battery, which can depend on the temperature, is too low, and, therefore, it is not possible to start the internal combustion engine. If the vehicle or rather the internal combustion engine is tow started, it can usually be assumed that (with the exception of a discharged battery) it will not be possible to re-start the internal combustion engine again until the defect in the vehicle has been remedied. If the driver turns off the internal combustion engine, or if owing to the operating conditions or additional functions, the internal combustion engine is automatically switched-off, it is possible, as a rule, to re-start again only by tow starting the internal combustion engine. In principle, however, it has not been possible to differentiate to date a tow start operation of the internal combustion engine in motor vehicles from a conventional start-up process by use of a starter or starter unit. Therefore, measures with respect to the operating mode of the internal combustion engine or specific functions that block the switching-off process of the internal combustion engine cannot be initiated.

The object of the invention is to provide a method by which it is possible to differentiate a tow start operation of the internal combustion engine from a conventional start-up process of the internal combustion engine by way of a starter unit.

This object is achieved by a method for detecting a tow start operation of an internal combustion engine in a motor vehicle, wherein a signal, representing the activity and/or inactivity of a starter unit of the internal combustion engine, is detected, and the tow start operation of the internal combustion engine is detected, when following detection of a successful start-up process of the internal combustion engine, the signal, representing the activity and/or inactivity of the starter unit, has not displayed any activity of the starter unit since the beginning of the start-up process of the internal combustion engine. Advantageous further developments are disclosed herein.

In one aspect of the invention, a tow start operation of the vehicle's internal combustion engine is detectable by the activity or inactivity of the starter, in particular, the starter unit. The inventive method for detecting a tow start operation of an internal combustion engine in a motor vehicle is characterized in that a signal, representing the activity and/or inactivity of a starter unit of the internal combustion engine, is detected and evaluated. A tow start operation of the internal combustion engine is detected, when following detection of a successful start-up process of the internal combustion engine, the signal, representing the activity and/or inactivity of the starter unit has not displayed any activity of the starter unit since the beginning of the start-up process. Therefore, the exclusive principle allows one to conclude in the absence of a starter actuation that external influences have caused the start-up process of the internal combustion engine, and, that working on this basis, an unintentional automatic shut-off process of the internal combustion engine is inhibited.

A successful start-up process of the internal combustion engine is detected advantageously when the initiation of a start-up process is detected, and when, for example, at the end of the start-up process, a speed overrun of the crankshaft speed is detected. A (successful) start-up process of the internal combustion engine, thus, a transition from the immobile engine to the running engine, can be detected by evaluating a signal that represents the activity of the internal combustion engine, for example, by evaluating the crankshaft speed. Then, a successful start-up is detected at the end of the start-up process by a speed overrun that occurs and is detectable and/or by reaching the idle speed. Such a detection of a successful start-up can be rendered plausible in its temporal sequence by an evaluation within a time frame and can be improved by additional timing and debounce mechanisms.

If the beginning of a start-up process is identified (for example, by means of the transition from the immobile to the rotating crankshaft), then the activity and/or inactivity of the starter unit of the internal combustion engine is checked by evaluating the signal, which represents the activity and/or inactivity of the starter unit of the internal combustion engine, advantageously for a predetermined time frame or speed that is predetermined for the internal combustion engine. The signal, representing the activity and/or inactivity of the starter unit, is configured advantageously in such a manner that when the activity of the starter is detected, the signal changes its status from "inactive" to "active." The signal can be reset from the "active" status to the "inactive" status after a predetermined time interval and successful evaluation upon reaching the end of the start-up process and successful evaluation and/or as a function of the speed of the internal combustion engine or on shutting down the internal combustion engine. As the final condition for a successful tow start operation, there must also occur, in addition to the inactivity of the starter upon initiation of the start-up process, the success of the tow start operation through the detection of the termination of the start-up process—only then may the tow start operation be evaluated as having occurred.

As already stated above, on detection of a tow start operation of the internal combustion engine, a variety of measures may be initiated with respect to the operating mode of the internal combustion engine. These measures lead to an improvement in the operating mode when the internal combustion engine is tow started. On detection of a tow start operation of the internal combustion engine, predetermined vehicle functions can be deactivated advantageously, for example, for the duration of a driving cycle, thus until the next manually conducted shut-off process of the internal combustion engine. These predetermined vehicle functions could enable or rather initiate an automatic shut-off process of the internal combustion engine.

If the motor vehicle is equipped, for example, with a hybrid drive unit, consisting of an internal combustion engine and an electric motor for driving the motor vehicle, it would be logical, for example, to inhibit the drive from changing from the internal combustion engine to the electric motor (that is, an automatic stop process of the internal combustion engine), if a tow start operation of the internal combustion engine was detected, for example, owing to a defective start-up system. This measure would prevent the vehicle from coming to a standstill following a change-over of the drive from the internal combustion engine to the electric motor, because even then the start-up system cannot re-start the internal combustion engine owing to a defect in the start-up system. In that case, it would not be possible to again start-up the internal combustion engine. Hence, there exists the risk of a breakdown.

If the motor vehicle is equipped with an automatic internal combustion engine stop function, which can be part of a so-called "automatic start/stop function", then an advantageous configuration of the invention provides that upon detection of a tow start operation of the internal combustion engine, this function is deactivated, or the implementation of its stop commands is blocked, because in the event that a tow started internal combustion engine is automatically shut-off, a re-start cannot be guaranteed as a rule. If the internal combustion engine were to be automatically shut off, it is very likely that it would have to be tow started again.

In summary it must be pointed out that upon detection of a tow started internal combustion engine, a variety of different measures can be initiated in order to avoid a so-called "stranded vehicle." In this way, warranty costs and customer complaints can be avoided.

Other objects, advantages and novel features of the present invention will become apparent from the following detailed description of one or more preferred embodiments when considered in conjunction with the accompanying drawings.

BRIEF DESCRIPTION OF THE DRAWING

The single FIGURE is a simplified flow chart for detecting a tow start operation of an internal combustion engine and showing the measures that are initiated on detection of a tow start operation.

DETAILED DESCRIPTION OF THE DRAWING

It is assumed that the motor vehicle, which is configured so as to be suitable for carrying out steps of the flow chart, is equipped with a function for automatically stopping and restarting the internal combustion engine. In addition, the motor vehicle is equipped with a hybrid drive system, consisting of an internal combustion engine and an electric motor for driving the motor vehicle. In this case, the two drive units can be used alternatingly for the drive. The flow chart in the FIGURE may be implemented, for example, in a motor control device or in a plurality of control devices that are intended for this purpose.

The flow chart for the method in accordance with an embodiment of the invention begins at step 10, where it is determined by an evaluation of the crankshaft speed kw, whether the internal combustion engine has been or shall be started (initiation of the start-up process), in which case, therefore, the condition St_BK has been met. As soon as the crankshaft speed increases starting from zero (standstill), the beginning of an attempt to start the internal combustion engine St_BK is detected. Thereupon, step 20 evaluates the crankshaft speed kw with respect to a speed overrun. As soon as a speed overrun is detected, a successful start-up of the internal combustion engine St_BK_e is determined and the method proceeds to step 30.

In the next step 30, a signal a_ST, representing the activity of a starter unit of the internal combustion engine, is evaluated. This signal is 0 when the starter unit is inactive and has not been active yet since the start-up process of the internal combustion engine St_BK. The signal changes from 0 to 1, as soon as any activity of the starter unit is or was determined. Step 30 checks whether the starter unit is or was active by checking whether a_ST=0. If the starter unit (a_ST==1) is or was active, then the flow chart is terminated at step 40, and a_ST=0 is set.

If the starter unit was not active, thus a_ST==1 does not hold, then in step 50 the function for automatically stopping and re-starting the drive unit is deactivated by generating a deactivation signal ASSF_off, and, in parallel, in step 60 a potential (future) change-over from running the internal combustion engine to running the electric motor in order to drive the hybrid vehicle is inhibited by generating a change-over inhibiting signal w_eM_off. This strategy prevents the internal combustion engine from being automatically shut-off and then no longer being startable, when a drive by means of the internal combustion engine is necessary or at least it appears to be logical.

As an alternative to this embodiment, it is possible, in addition or as an alternative, to deactivate or influence a plethora of other functions, so that they can cope with the operating principle of a tow started internal combustion engine. Besides the input variable kw in steps 10 and 20, a plurality of other input parameters can also be utilized (separately or in addition to kw) in order to detect the start-up situation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a motor vehicle having an internal combustion engine, the method comprising the acts of:
- detecting an initiation of a start-up process of the internal combustion engine;
- detecting a successful start-up of the internal combustion engine;
- detecting a signal representing an activity and/or inactivity of a starter unit of the internal combustion engine;
- determining that a tow start operation of the internal combustion engine occurred in the event the signal representing the activity and/or inactivity of the starter unit has not displayed any activity of the starter unit during a period of time between the detected initiation of the start-up process of the internal combustion engine and the detected successful start-up of the internal combustion engine.

2. The method according to claim 1, wherein the act of detecting the successful start-up process comprises detecting a speed overrun at an end of the start-up process.

3. The method according to claim 2, further comprising the act of:
- upon determining that the tow start operation occurred, deactivating predetermined vehicle functions.

4. The method according to claim 2, further comprising the act of:
- upon determining that the tow start operation of the internal combustion engine occurred, deactivating a function for automatically shutting-off the internal combustion engine.

5. The method according to claim 1, wherein the act of detecting the successful start-up process comprises one of the acts of:

evaluating a signal representing activity of the internal combustion engine; and evaluating one or more of a plurality of parameters describing a state of the internal combustion engine.

6. The method according to claim 5, further comprising the act of:

upon determining that the tow start operation occurred, deactivating predetermined vehicle functions.

7. The method according to claim 5, further comprising the act of:

upon determining that the tow start operation of the internal combustion engine occurred, deactivating a function for automatically shutting-off the internal combustion engine.

8. The method according to claim 1, further comprising the act of:

upon determining that the tow start operation occurred, deactivating predetermined vehicle functions.

9. The method according to claim 1, further comprising the act of:

upon determining that the tow start operation of the internal combustion engine occurred, deactivating a function for automatically shutting-off the internal combustion engine.

10. The method according to claim 1, wherein the motor vehicle further includes an electric motor, the method further comprising the act of:

upon determining that the tow start operation of the internal combustion engine occurred, inhibiting a switch-over from running the internal combustion engine to running the electric motor.

11. A method of operating a motor vehicle having an internal combustion engine, the method comprising the acts of:

detecting an initiation of a start-up process of the internal combustion engine based on a crankshaft speed;

detecting a successful start-up of the internal combustion engine when a speed overrun of the crankshaft speed occurs;

detecting a signal representing an activity and/or inactivity of a starter unit of the internal combustion engine; and determining that a tow start operation of the internal combustion engine has occurred when the signal representing the activity and/or inactivity of the starter unit indicates inactivity of the starter unit during a period of time between the detected initiation of the start-up process of the internal combustion engine and the detected successful start-up of the internal combustion engine.

12. The method according to claim 11, further comprising the act of:

in response to determining that the tow start operation occurred, deactivating a predetermined vehicle function.

13. The method according to claim 12, wherein the predetermined vehicle function is a function for automatically shutting-off the internal combustion engine.

14. The method according to claim 12, wherein the motor vehicle further includes an electric motor, and wherein the predetermined vehicle function is a function for changing-over from running the internal combustion engine to running the electric motor.

* * * * *